(12) United States Patent
Ma et al.

(10) Patent No.: US 11,914,196 B2
(45) Date of Patent: Feb. 27, 2024

(54) OPTICAL FERRULE ASSEMBLIES

(71) Applicant: 3M INNOVATIVE PROPERTIES COMPANY, St. Paul, MN (US)

(72) Inventors: Changbao Ma, Austin, TX (US); James M. Nelson, Lino Lakes, MN (US); Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/266,043

(22) PCT Filed: Nov. 23, 2021

(86) PCT No.: PCT/IB2021/060856
§ 371 (c)(1),
(2) Date: Jun. 8, 2023

(87) PCT Pub. No.: WO2022/130071
PCT Pub. Date: Jun. 23, 2022

(65) Prior Publication Data
US 2023/0393348 A1 Dec. 7, 2023

Related U.S. Application Data

(60) Provisional application No. 63/199,248, filed on Dec. 16, 2020.

(51) Int. Cl.
*G02B 6/38* (2006.01)
(52) U.S. Cl.
CPC ......... *G02B 6/3829* (2013.01); *G02B 6/3854* (2013.01); *G02B 6/3855* (2013.01)
(58) Field of Classification Search
CPC ... G02B 6/3829; G02B 6/3854; G02B 6/3855
See application file for complete search history.

(56) References Cited

U.S. PATENT DOCUMENTS

2011/0305417 A1* 12/2011 Wang .................. G02B 6/3817
385/39
2017/0168248 A1 6/2017 Hayauchi et al.
2018/0267255 A1 9/2018 Butler et al.

FOREIGN PATENT DOCUMENTS

JP   2007171556 A   7/2007
WO  2020003245 A1   1/2020

OTHER PUBLICATIONS

International Search Report for PCT International Application No. PCT/IB2021/060856, dated Mar. 7, 2022, 5 pages.

* cited by examiner

*Primary Examiner* — Sung H Pak
*Assistant Examiner* — Hoang Q Tran
(74) *Attorney, Agent, or Firm* — Jonathan L. Tolstedt

(57) ABSTRACT

An optical ferrule assembly includes a hybrid optical ferrule having a glass portion assembled to a polymeric portion. The polymeric portion includes a groove for receiving and supporting an optical fiber having opposing open front and back ends. A light redirecting member includes an input surface for receiving light from the optical fiber and a light redirecting side. The open back end of the groove and the input surface define a recessed region therebetween. The glass portion includes an optically transparent glass insert disposed in the recessed region conforming in shape to an internal shape of the recessed region. An optical fiber is received and supported in the groove. The optical fiber includes a fiber end laser welded to the glass insert so that a central light ray from the optical fiber propagates through the glass insert before being received and redirected by the light redirecting side.

10 Claims, 5 Drawing Sheets

OPTICAL FERRULE ASSEMBLIES

CROSS REFERENCE TO RELATED APPLICATIONS

This application is a national stage filing under 35 U.S.C. 371 of PCT/IB2021/060856 filed Nov. 23, 2023, which claims the benefit of Provisional U.S. Application No. 63/199,248, filed Dec. 16, 2020, the disclosures of which are incorporated by reference in their entireties herein.

TECHNICAL FIELD

This disclosure relates generally to optical coupling devices such as optical ferrules and optical ferrule assemblies.

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output. For some applications, optical fibers may be coupled to other optical fibers and/or system components by an optical connector. Optical connectors, including expanded beam optical connectors, can include optical ferrules having elements for receiving and securing optical waveguides, elements for affecting light from the optical waveguides, and features for aligning the optical ferrule to a mating optical ferrule. The optical components used in fiber optics communications often contain numerous materials having distinct physical properties. A single optical component can contain organic polymers, glass, and/or metals that can be fused together into one article.

SUMMARY

Various aspects and embodiments described herein relate to optical connectors and optical ferrules.

Some aspects of the disclosure relate to an optical ferrule assembly including a hybrid optical ferrule having a glass portion assembled to a polymeric portion. The polymeric portion includes a groove for receiving and supporting an optical fiber and has opposing open front and back ends. A light redirecting member includes an input surface for receiving light from an optical fiber received and supported in the groove and a light redirecting side for changing a direction of light received from the input surface. The open back end of the groove is disposed between the open front end of the groove and the input surface. The open back end of the groove and the input surface define a recessed region therebetween. The glass portion includes an optically transparent glass insert disposed in the recessed region and substantially conforms in shape to an internal shape of the recessed region. An optical fiber received and supported in the groove includes a fiber end laser welded to the glass insert so that a central light ray from the optical fiber propagates through the glass insert before being received and redirected by the light redirecting side.

Some aspects of the disclosure relate to an optical ferrule assembly including an optical ferrule having an input surface, a light reflecting side, an output surface, a first glass portion and a second polymeric portion. An optical fiber is attached to the optical ferrule and includes a fiber end laser welded to the first glass portion. A central light ray from the optical fiber enters the optical ferrule through the input surface along a first direction and exits the optical ferrule through the output surface along a different second direction after propagating through each of the first glass and second polymeric portions and being reflected by the light reflecting side.

Some aspects of the disclosure relate to an optical ferrule assembly including an optical ferrule having a light input surface, a light redirecting surface, a light output surface, a glass portion including glass and the light input surface, and a polymeric portion including a polymer and disposed between the glass portion and the light redirecting surface. The optical ferrule assembly includes a plurality of optical fibers. Each optical fiber includes a fiber end laser welded to the light input surface. A central light ray emitted by the optical fiber enters the optical ferrule through the light input surface and exits the optical ferrule though the light output surface after being redirected by the light redirecting surface. While propagating from the light input surface to the light output surface, the light propagates through the glass and polymeric portions of the optical ferrule.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIGS. 1-3 schematically show different views of an optical ferrule and an optical ferrule assembly according to some aspects of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Optical fibers are normally bonded to optical ferrules using adhesives. Assemblies of optical fibers and ferrules may have reliability problems in terms of misalignment and degradation due to material properties (i.e., use of plastic for ferrule construction) and thermal, moisture and radiation loads, especially when adhesives are in the optical paths. The embodiments disclosed herein address these and other challenges.

Some embodiments of the disclosure relate to optical ferrule assemblies without the inclusion of adhesives in the optical path or where the adhesives are removed from the fiber facet area where the light radiation has the highest density.

Figure 1:
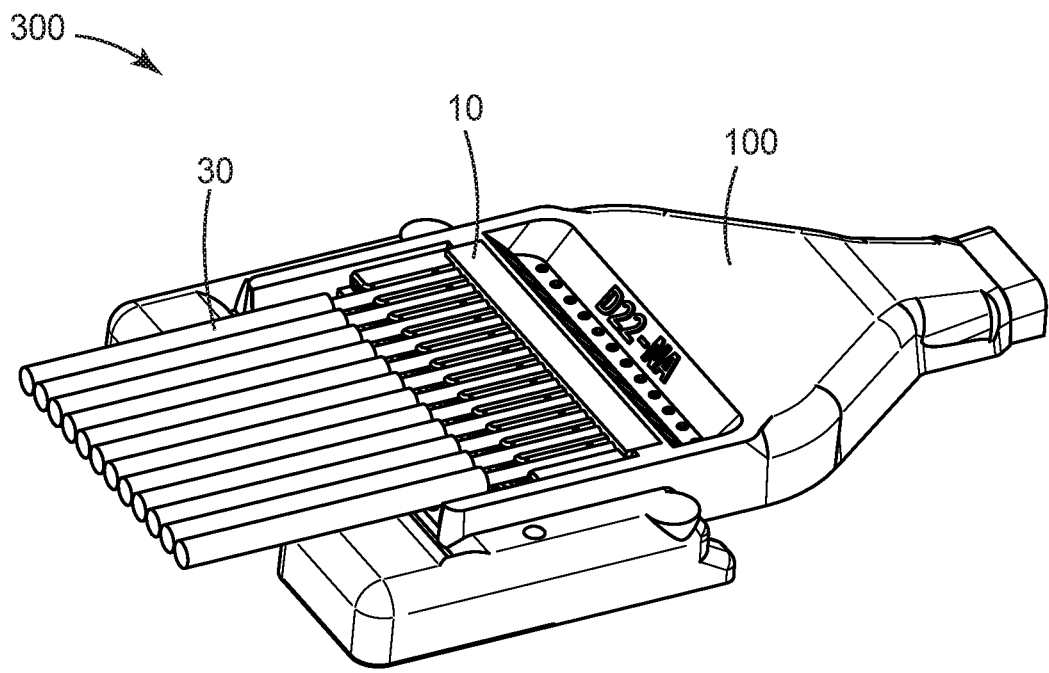
Figure 2:
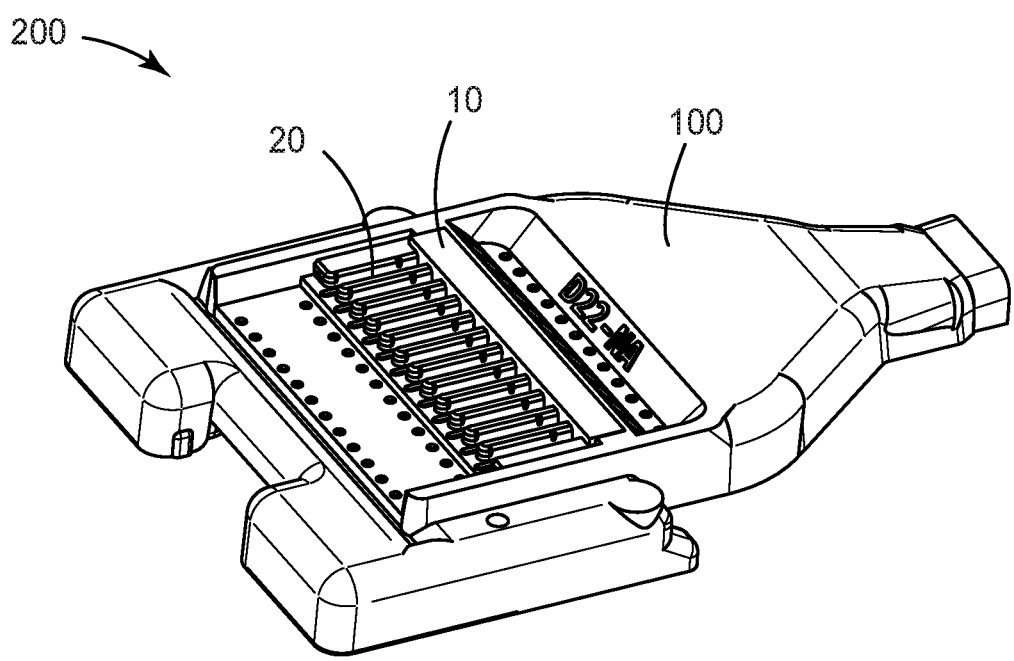
Figure 3:
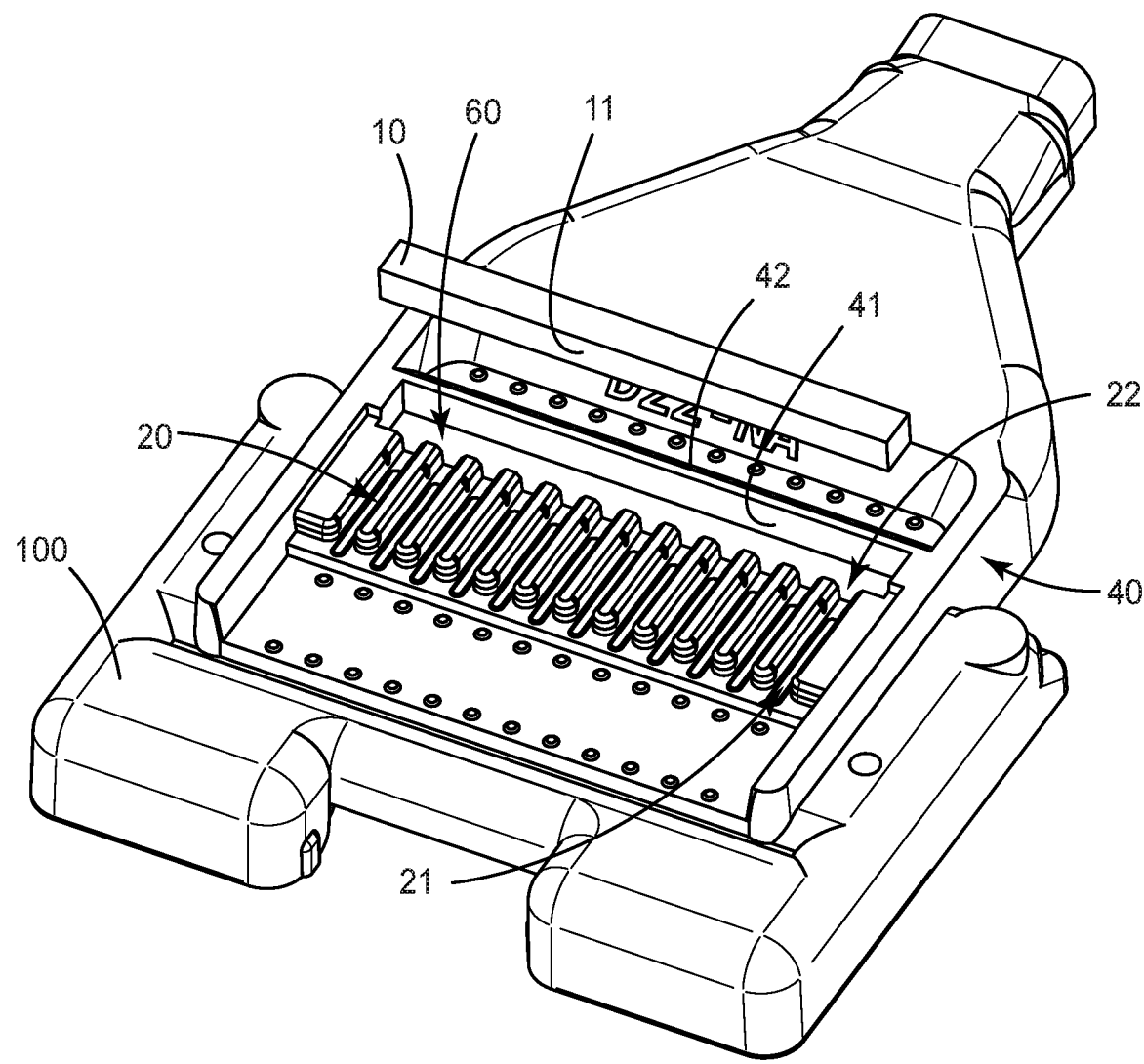

Some embodiments of a hybrid optical ferrule (200) are illustrated in FIGS. 1-3. The hybrid optical ferrule (200) may have a unitary construction (e.g., a construction including a first piece integrally formed on a second piece). In other aspects, the optical ferrule may be a ferrule that includes pieces formed separately and adhered or otherwise fastened together. The ferrule may be made from any suitable materials including polymers or ceramics. The ferrule may include one or more elements that guide or help guide the ferrule and a mating ferrule into alignment when the two ferrules are mated. In some aspects, the optical ferrule and/or the mating optical ferrule may be hermaphroditic.

An optical ferrule assembly (300) according to some embodiments as illustrated in FIGS. 1-3 includes a hybrid optical ferrule (200) and an optical waveguide (30) attached to the hybrid optical ferrule. In some embodiments, the hybrid optical ferrule (200) includes a groove (20) with opposing open front (21) and back (22) ends, and the optical waveguide (30) may be received and supported in the groove. The optical waveguide (30) according to some embodiments may be an optical fiber (30). In some aspects, the hybrid optical ferrule (200) may include a plurality of grooves (20), substantially parallel to each other, for receiving and securing a plurality of optical waveguides (30). Each optical waveguide (30) may be received and secured in a different groove. At the point of attachment, the fiber buffer coating and protective jacket, if any, of the optical waveguide (30) are stripped away to allow only the bare optical fibers to lie aligned with the grooves (20). The groove (20), according to some embodiments, can be u-shaped, v-shaped, or contain chamfer or tapered edges to ease insertion and/or reception of the optical waveguide (30). In other optical ferrule assemblies (300), the groove (20) can be replaced with a circular, square, diamond, or other cross-sectional shape receptacle (i.e., hole) that can hold the optical waveguide (30).

In some embodiments, the plurality of optical waveguides (30) may form an optical waveguide array of an optical cable. The term optical waveguide is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross-sectional shape, e.g., circular, square, rectangular etc. The individual waveguides in the waveguide array may be optical fibers made of glass with a protective buffer coating. Multiple parallel waveguides of a waveguide array may be enclosed by a jacket.

In some aspects, the hybrid optical ferrule (200) includes a first portion (10) and a second portion (100) assembled to each other. In some embodiments, the first (10) and second (100) portions may have different respective first and second compositions. The first portion (10) may be disposed within a recessed region (60) defined in the hybrid optical ferrule (200) as shown in FIG. 3. For instance, the first portion including the first composition may be a first glass portion (10) and the second portion including the second composition may be a second polymeric portion (100) having the groove (20) for receiving and supporting the optical waveguide (30). In other instances, the first composition may include any material that can handle high power density of light at suitable wavelengths. High power density generally refers to optical intensity greater than 3.0E6 mW/cm 2 (exampled using 1 mW of light power from a single mode fiber with a core diameter of gum) propagating in the ferrule. For example, the first composition can be silica, or sol-gel or nanocomposites that can be filled into the recessed region (60) and cured.

Figure 4:
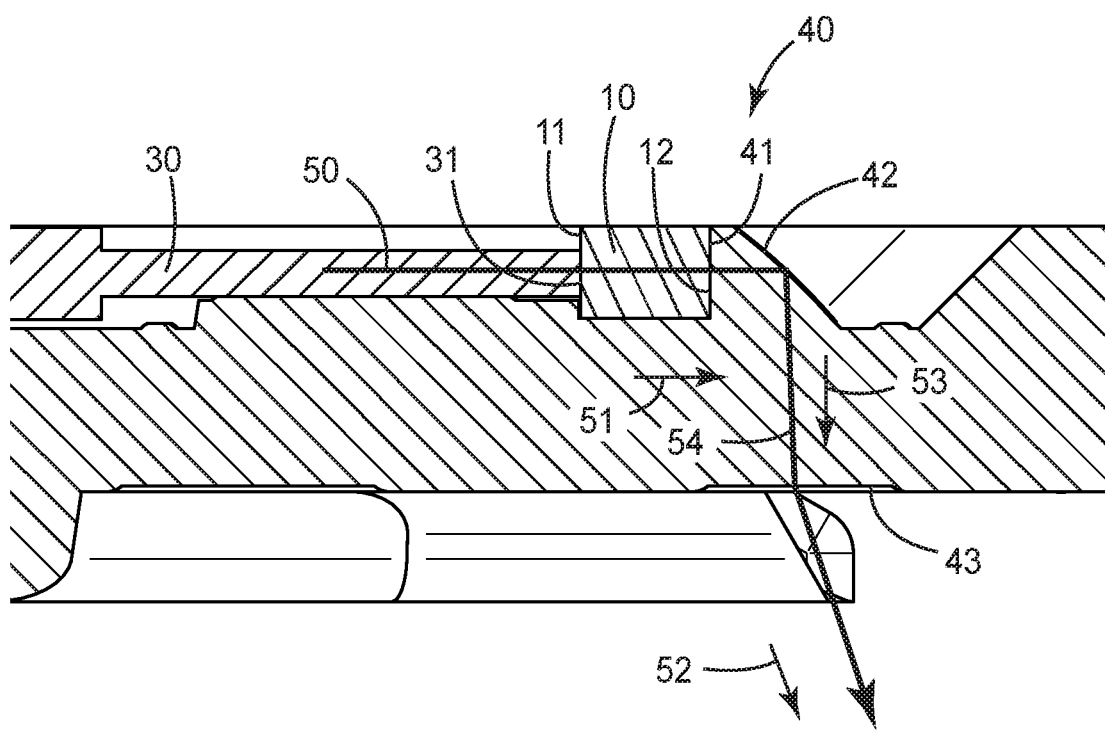
FIG. 4-7 schematically show cross-sectional views of the optical ferrule according to different aspects of the disclosure.
Figure 5:
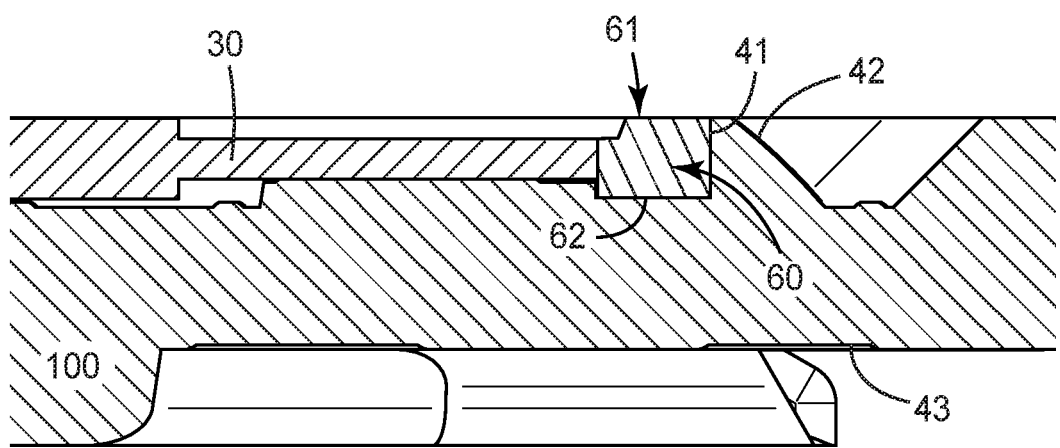

In some embodiments, the hybrid optical ferrule (200) may include a light input surface (11), a light redirecting side (42), and a light output surface (43) as represented in FIG. 4 and FIG. 5. In some other embodiments, the optical ferrule (200) may include a light input surface (11), a light redirecting surface (42), a light output surface (43), a glass portion (10) including glass and the light input surface, and a polymeric portion (100) including a polymer and disposed between the glass portion (10) and the light redirecting surface (42). In some cases, the light redirecting surface (42) may include an array of light redirecting elements, at least one for each optical waveguide (30). The fiber ends (31) of the optical waveguide (30) aligned in the grooves (20) may be situated so as to be able to redirect the central light ray (50) emanating from each optical waveguide (30) into an input side or face of a corresponding light redirecting element in the light redirecting surface (42) of a mating ferrule (not shown). For example, in various embodiments, each light redirecting element in the light redirecting surface (42) may include one or more of a prism, a lens, and a reflecting surface, such as a mirror or the like, to collimate light.

In some embodiments, the fiber end (31) of the optical waveguide (30) attached to the hybrid optical ferrule (200) may be laser welded to the first glass portion (10). In other embodiments, each of the fiber ends (31) of the plurality of optical waveguide (30) may be laser welded to the light input surface (11). Laser welding involves fusing the optical fiber end (31) and the first glass portion (10) together with intense but localized heat. The interface surfaces being attached may experience temperatures of up to and over 1000° C. for times on the order of milliseconds to seconds depending on the results that are sought. For instance, a CO 2 laser with a wavelength of 10.6 um with high absorption ratio may be used for the laser welding. Since the fiber ends (31) are welded to the input surface (11) of the ferrule, there is no adhesive in the optical path. Since the fiber end (31) is welded to the glass portion (10) of the ferrule, there is no adhesive in the optical path. In some instances, the laser welding may include welding each optical fiber to the glass portion (10) or input surface (11) of the ferrule, by either moving the laser beam from one fiber to the other or moving the ferrule with respect to the laser beam. Centering the laser beam with respect to the fiber in the lateral direction may cancel out distortions of the fiber end positions after welding caused due to mismatches of the coefficients of thermal expansion (CTE). In some instances, the laser welding may include melting the polymer material of the optical ferrule to fuse the optical fiber end (31) with the input surface (11).

A central light ray (50) from an optical waveguide (30) attached to the hybrid optical ferrule (200) may be received and transmitted by the light input surface (11). The hybrid optical ferrule (200) is so configured that light entering the optical ferrule through the light input surface (11) exits the optical ferrule though the light output surface (43) after being redirected by the light redirecting surface (42). The redirected central light ray (50) exits the hybrid optical ferrule (200) through the light output surface (43) of the optical ferrule and may be configured to enter a mating optical ferrule (not shown). In some embodiments, as the central light ray (50) propagates in the hybrid optical ferrule (200) from the light input surface (11) to the light output surface (43), the central light ray (50) propagates through the first glass portion (10) and the second polymeric portion (100) of the optical ferrule.

In some aspects, as best seen in FIG. 4, the central light ray (50) from the optical waveguide (30) may enter the hybrid optical ferrule (200) through the input surface (11) along a first direction (51) and may exit the optical ferrule through the output surface (43) along a different second direction (52) after propagating through each of the first glass (10) and second polymeric (100) portions and being reflected by the light redirecting surface (42).

In other aspects, the central light ray (50) from the optical waveguide (30) may enter the hybrid optical ferrule (200) through the input surface (11) along the first direction (51) and may be reflected by the light reflecting surface (42) along a different third direction (53). The reflected central light ray (54) may exit the hybrid optical ferrule (200) through the light output surface (43) of the optical ferrule along the second direction (52) after propagating through each of the first glass and second polymeric portions.

In some aspects, the first glass portion (10) may include only one of the light input (11) and output (43) surfaces. In some cases, the first glass portion (10) may include the light input surface (11), and the second polymeric portion (100) may include the light output surface (43). In some other cases, the first glass portion (10) may include both the light input (11) and output (43) surfaces. In some other cases, the glass portion (10) may include the light output surface (43).

Figure 8:
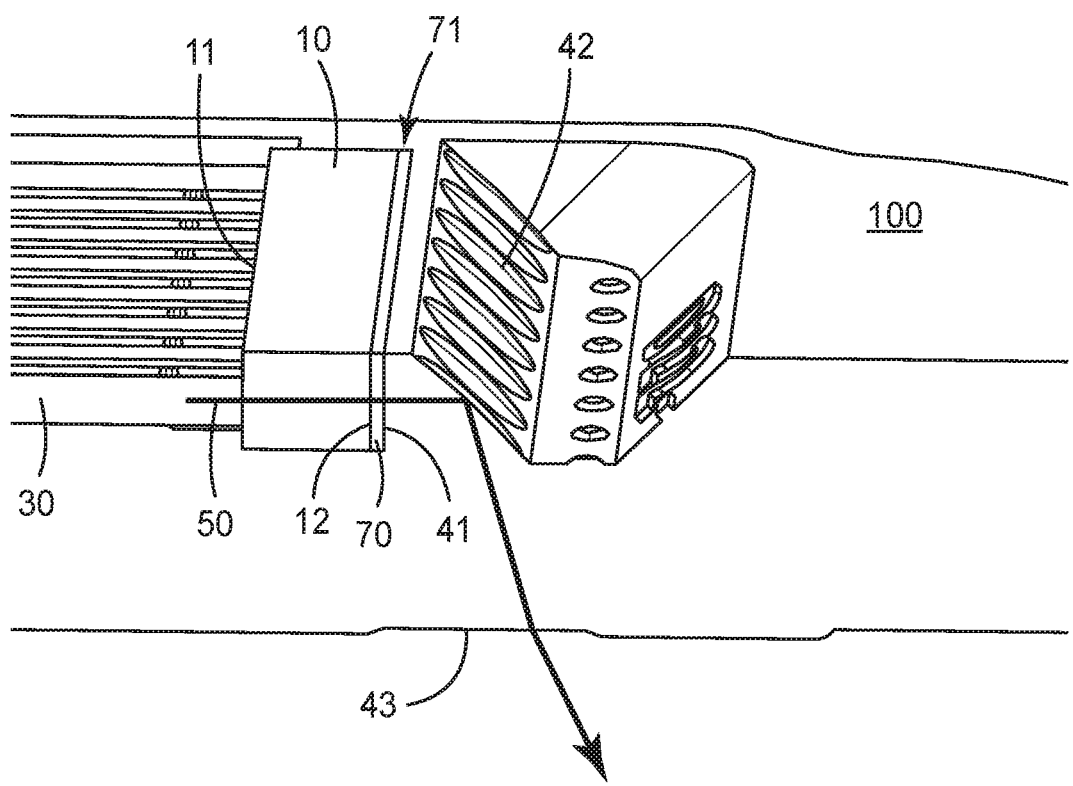
FIG. 8 schematically shows the cross-sectional view of the optical ferrule and the propagation of a light ray through the various elements of the optical ferrule according to some aspects.

Referring to FIG. 4, in some embodiments, the first glass portion (10) may include a first surface (12) and the second polymeric portion (100) may include a second surface (41). In some embodiments, the central light ray (50) exits the first glass portion (10) through the first surface (12) of the first glass portion and enters the second polymeric portion (100) through the second surface (41) of the second polymeric portion. In some instances, the first and second surfaces (12, 41) may directly contact each other with no gap therebetween. In other instances, the first and second surfaces (12, 41) may define a gap (71) therebetween as represented in FIG. 8. The gap (71) may be substantially filled with an optical adhesive (70). For instance, curable adhesives may be dispensed in the gap (71) between the first and second surfaces (12, 41). Upon wicking, the adhesives may be cured to obtain the hybrid optical ferrule (200). There has been reason to include significantly thick sections of adhesive between the fiber facet and the input surface of the ferrule to remove the delamination when the adhesive is thin. In embodiments of this invention, the thickness of the adhesive layer can be much thinner with no delamination occurring with the glass insert providing protection to the second polymeric portion (100).

The polymeric portion (100) in some embodiments may include a light redirecting member (40) as best seen in FIGS. 3 and 4. The light directing member (40) may include an input surface (11) for receiving a central light ray (50) from an optical waveguide (30), and a light redirecting surface (42) for changing a direction of light received from the input surface (11). The open back end (22) of the groove (20) may be disposed between the open front end (21) of the groove and the input surface (11). As shown in FIG. 3, the second polymeric portion (100) defines a receiving space (60) therein, and the first glass portion (10) may be disposed within the receiving space (60). In some cases, the receiving space (60) may be formed as a recessed region between the open back end (22) of the groove (20) and the input surface (11) and the glass portion including an optically transparent glass insert (10) may be disposed in the recessed region. The glass insert (10) may be substantially conforming in shape to an internal shape of the recessed region. In some cases, the glass portion (10) may be a single continuous piece (10) that covers all optical fibers attached to the ferrule. In some embodiments the optical waveguide (30) including a fiber end (31) may be laser welded to the glass insert (10) so that a central light ray (50) from the optical waveguide (30) propagates through the glass insert (10) before being received and redirected by the light redirecting surface (42).

Figure 6:
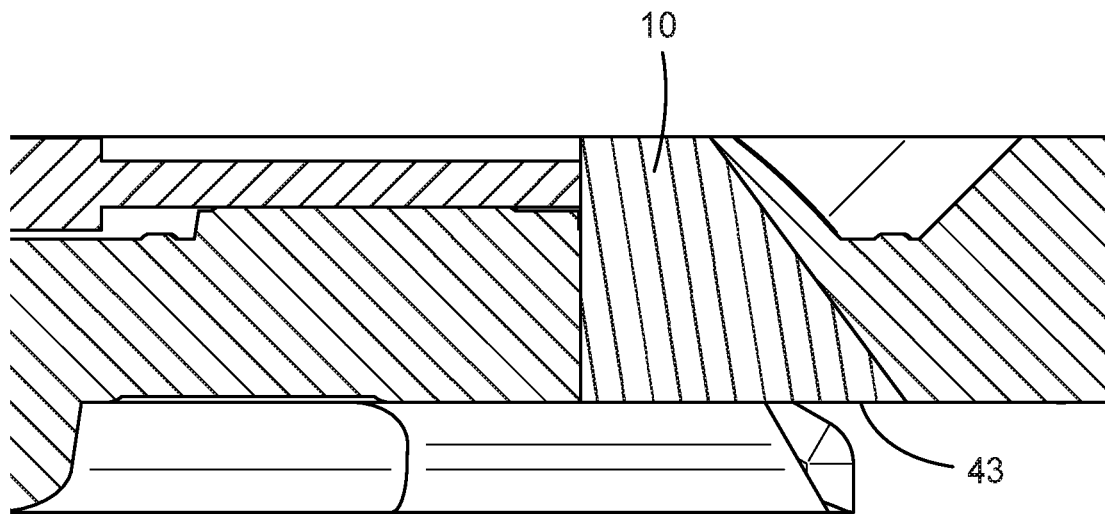
Figure 7:
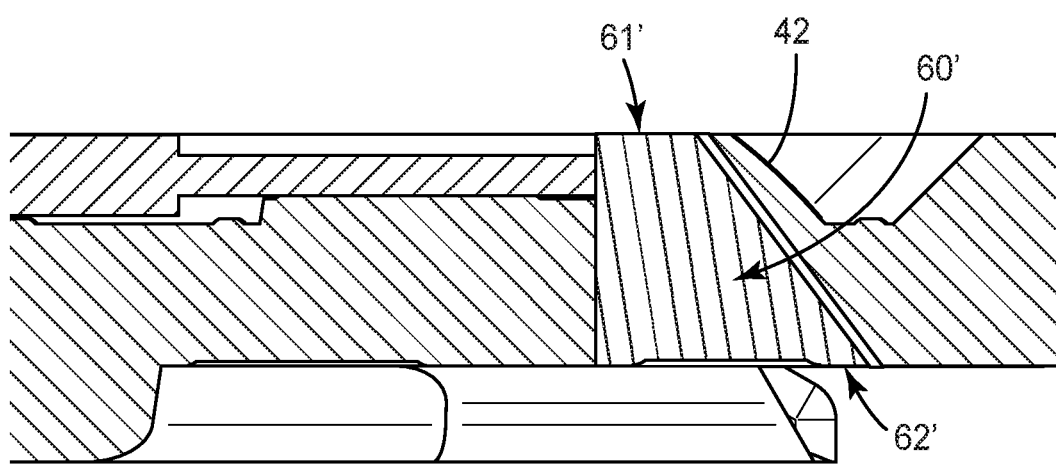

In some cases, as best shown in FIGS. 6 and 7, the glass portion (10) may have a trapezoidal cross-section conforming to a similar internal shape of the recessed region (60'). The glass portion (10) with trapezoidal cross-section may help reduce the reflected light at the interfaces from getting back to the optical fiber, thus achieving better return loss. In some cases, the glass portion (10) may include the light input surface (11). According to this embodiment, the central light ray (50) from the optical waveguide (30) aligned by the groove (20) propagates through the glass portion (10) before being received and redirected by the light redirecting surface (42).

In some aspects, the glass portion (10) may be prepared from suitable materials such as fused silica, borosilicate, Pyrex, calcium fluoride ($CaF_2$), Quartz crystal, Silicon, YAG, ZnS, fluorozirconate, fluoroaluminate, aluminosilicate, germanosilicate, phosphosilicate, borosilicate, chalcogenide, etc. In some instances, the suitable materials may need to be coated to match the refractive indices needed for desired performance. The recessed region maybe formed in existing ferrules using laser ablation, FIB milling, machining, etching, RIE, or ICP techniques. In other instances, the recessed region may be formed integrally while manufacturing the ferrule. In some cases, the recessed region may need to be tapered in a direction normal to the light output surface (43) with precisely controlled pinch points for controlling the insertion and securing of the glass portion (10) within the recessed region.

In some aspects of the disclosure, the receiving space (60) may define an open top (61) and includes a closed bottom (62) as shown in FIG. 5. In other aspects, the receiving space (60') may be a through opening defining an open top (61') and an open bottom (62') as shown in FIG. 7.

In other cases, the optical fiber end (31) may be laser welded to the glass portion (10) by using a separate, high temperature tolerant, metal or ceramic alignment fixture. The alignment fixture may include groove structures similar to the hybrid optical ferrule (200) for aligning optical cables, and a pocket similar to the receiving space (60) of the hybrid optical ferrule (200) for loading the glass portion (10). The optical fibers and the glass portion may be mounted in the alignment fixture and the fiber ends of the optical fibers may be laser welded to the glass portion to obtain a fiber and glass assembly. The fiber and glass assembly may be removed from the alignment fixture and attached to the hybrid optical ferrule (200) by known methods, ensuring that the fibers are aligned to the light redirecting elements of the ferrule, by aligning the optical waveguide (30) to the grooves (20).

The invention claimed is:
1. An optical ferrule assembly comprising:
 a hybrid optical ferrule comprising a glass portion assembled to a polymeric portion, the polymeric portion comprising:

a groove for receiving and supporting an optical fiber and comprising opposing open front and back ends; and a light redirecting member comprising:
an input surface for receiving light from an optical fiber received and supported in the groove; and
a light redirecting side for changing a direction of light received from the input surface, wherein the open back end of the groove is disposed between the open front end of the groove and the input surface, the open back end of the groove and the input surface defining a recessed region therebetween; and
the glass portion comprising an optically transparent glass insert disposed in the recessed region and substantially conforming in shape to an internal shape of the recessed region; and an optical fiber received and supported in the groove, the optical fiber comprising a fiber end laser welded to the glass insert so that a central light ray from the optical fiber propagates through the glass insert before being received and redirected by the light redirecting side.

2. The optical ferrule assembly of claim 1, wherein the recessed region defines an open top and comprises a closed bottom.

3. The optical ferrule assembly of claim 1, wherein the recessed region is a through opening defining an open top and an open bottom.

4. An optical ferrule assembly comprising:
an optical ferrule comprising an input surface, a light reflecting side, an output surface, a first glass portion and a second polymeric portion; and
an optical fiber attached to the optical ferrule and comprising a fiber end laser welded to the first glass portion, such that a central light ray from the optical fiber enters the optical ferrule through the input surface along a first direction and exits the optical ferrule through the output surface along a different second direction after propagating through each of the first glass and second polymeric portions and being reflected by the light reflecting side.

5. The optical ferrule assembly of claim 4, wherein the central light ray from the optical fiber enters the optical ferrule through the input surface along the first direction and is reflected by the light reflecting side along a different third direction, the reflected central light ray exiting the optical ferrule through the output surface of the optical ferrule along the second direction after propagating through each of the first glass and second polymeric portions.

6. The optical ferrule assembly of claim 4, wherein the second polymeric portion defines a receiving space therein, and wherein the first glass portion is disposed within the receiving space.

7. The optical ferrule assembly of claim 4, wherein the receiving space defines an open top and comprises a closed bottom, and wherein the first glass portion comprises the input surface, and the second polymeric portion comprises the output surface.

8. The optical ferrule assembly of claim 4, wherein the central light ray exits the first glass portion through a first surface of the first glass portion and enters the second polymeric portion through a second surface of the second polymeric portion.

9. An optical ferrule assembly comprising:
an optical ferrule comprising a light input surface, a light redirecting surface, a light output surface, a glass portion comprising glass and the light input surface, and a polymeric portion comprising a polymer and disposed between the glass portion and the light redirecting surface; and
a plurality of optical fibers, each optical fiber comprising a fiber end laser welded to the light input surface, such that a central light ray emitted by the optical fiber enters the optical ferrule through the light input surface and exits the optical ferrule though the light output surface after being redirected by the light redirecting surface, wherein while propagating from the light input surface to the light output surface, the light propagates through the glass and polymeric portions of the optical ferrule.

10. The optical ferrule assembly of claim 9, wherein the glass portion further comprises the light output surface, and wherein the glass portion has a trapezoidal cross-section.

* * * * *